United States Patent
Quatannens et al.

(10) Patent No.: US 11,011,772 B2
(45) Date of Patent: May 18, 2021

(54) CATHODE FLOW FUEL CELL SYSTEMS AND MANIFOLDS WITH AN ADD-ON STIFFENER

(71) Applicant: FuelCell Energy, Inc., Danbury, CT (US)

(72) Inventors: Michael L. Quatannens, Mt. Kisco, NY (US); Daniela Nedu, New Fairfield, CT (US); Doan Hoang, Watertown, CT (US); Robert S. Fournier, West Hartford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 149 days.

(21) Appl. No.: 16/095,256

(22) PCT Filed: Apr. 20, 2017

(86) PCT No.: PCT/US2017/028659
§ 371 (c)(1),
(2) Date: Oct. 19, 2018

(87) PCT Pub. No.: WO2017/184878
PCT Pub. Date: Oct. 26, 2017

(65) Prior Publication Data
US 2019/0097256 A1 Mar. 28, 2019

Related U.S. Application Data

(60) Provisional application No. 62/325,721, filed on Apr. 21, 2016.

(51) Int. Cl.
*H01M 8/2485* (2016.01)
*H01M 8/2465* (2016.01)
(Continued)

(52) U.S. Cl.
CPC ....... *H01M 8/2485* (2013.01); *H01M 8/2425* (2013.01); *H01M 8/2457* (2016.02);
(Continued)

(58) Field of Classification Search
None
See application file for complete search history.

(56) References Cited

U.S. PATENT DOCUMENTS

| 4,310,605 A | 1/1982 | Early et al. |
| 4,345,009 A | 8/1982 | Fahle et al. |

(Continued)

FOREIGN PATENT DOCUMENTS

| CN | 201126844 Y | | 10/2008 |
| JP | 2011-171026 | * | 9/2011 |
| JP | 2011-171026 A | | 9/2011 |

OTHER PUBLICATIONS

International Search Report and Written Opinion in PCT/US2017/028659 dated Aug. 4, 2017 (10 pages).

*Primary Examiner* — Basia A Ridley
*Assistant Examiner* — Heng M. Chan
(74) *Attorney, Agent, or Firm* — Foley & Lardner LLP

(57) ABSTRACT

A fuel cell system includes a fuel cell stack including a plurality of fuel cells positioned between opposing end plates, an anode manifold configured to direct anode gas into or out of the fuel cell stack, a cathode manifold configured to direct cathode gas into or out of the fuel cell stack, and at least one truss attached to an external surface of at least one of the cathode manifold or the anode manifold. The at least one truss is configured to reinforce the fuel cell system.

20 Claims, 16 Drawing Sheets

(51) Int. Cl.
    *H01M 8/2484*     (2016.01)
    *H01M 8/2457*     (2016.01)
    *H01M 8/2425*     (2016.01)
    *H01M 8/14*     (2006.01)
    *H01M 8/248*     (2016.01)

(52) U.S. Cl.
    CPC ....... *H01M 8/2465* (2013.01); *H01M 8/2484* (2016.02); *H01M 8/248* (2013.01); *H01M 2008/147* (2013.01); *Y02E 60/50* (2013.01)

(56) References Cited

U.S. PATENT DOCUMENTS

| | | |
|---|---|---|
| 4,591,538 A | 5/1986 | Kunz |
| 4,849,308 A | 7/1989 | Schmitten et al. |
| 5,486,428 A | 1/1996 | Gardner et al. |
| 2004/0043275 A1 | 3/2004 | Mattejat et al. |
| 2004/0121216 A1* | 6/2004 | Blanchet ............... H01M 8/248 429/470 |
| 2006/0093890 A1 | 5/2006 | Steinbroner |
| 2006/0151041 A1* | 7/2006 | Koizumi ................ B21D 15/06 138/118 |
| 2012/0196202 A1* | 8/2012 | McInerney ....... H01M 8/04082 429/444 |

\* cited by examiner

FIG. 12A
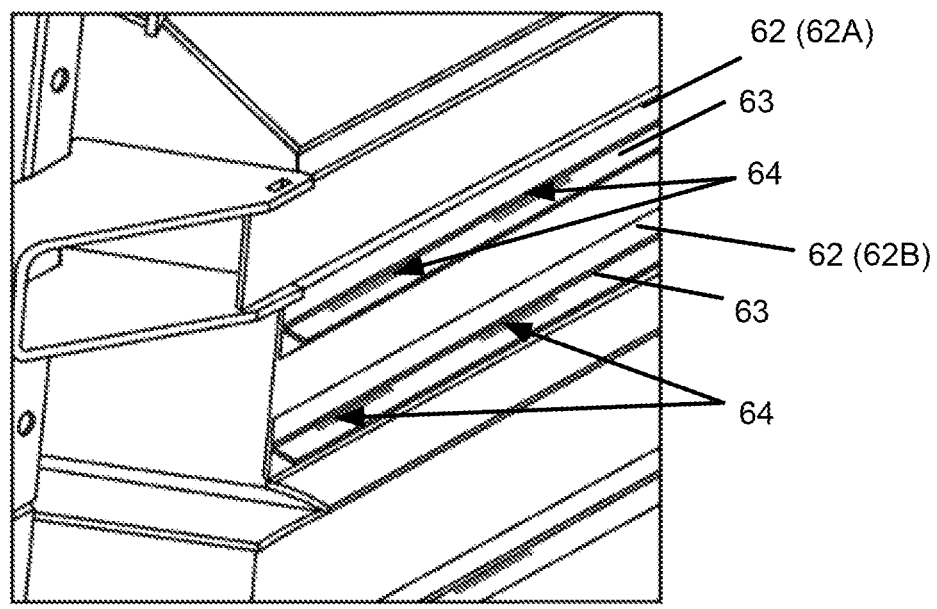
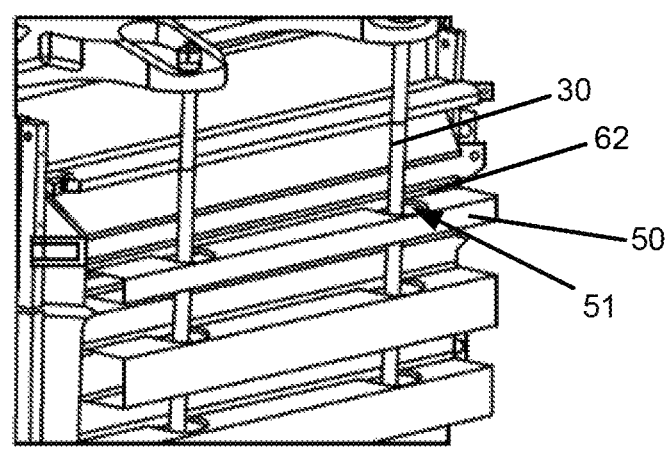
FIG. 12B

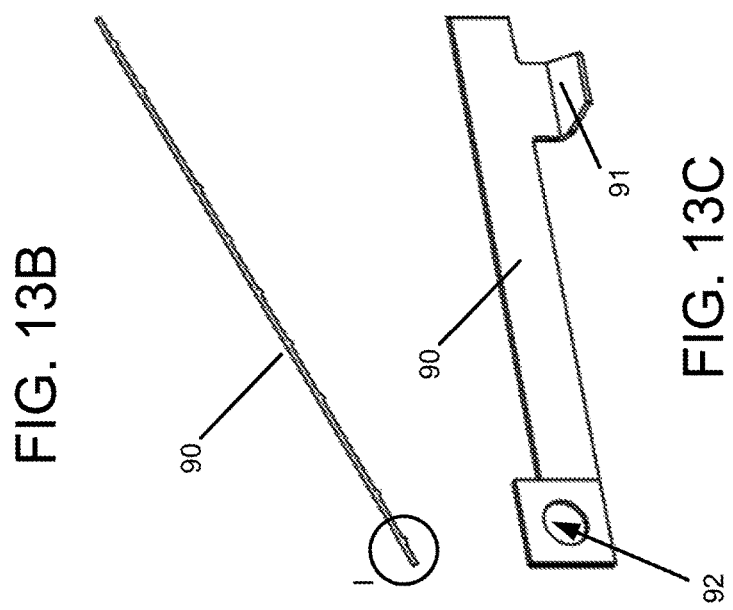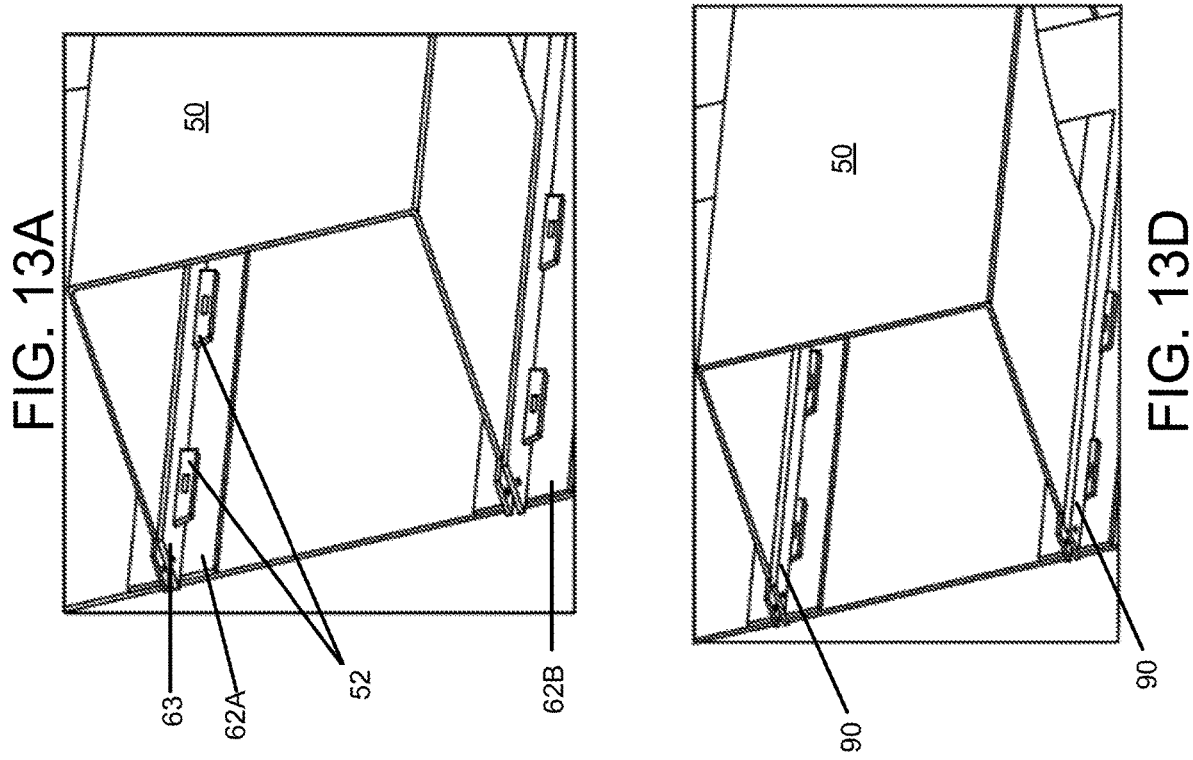

CATHODE FLOW FUEL CELL SYSTEMS AND MANIFOLDS WITH AN ADD-ON STIFFENER

CROSS-REFERENCE TO RELATED APPLICATIONS

The present application is a U.S. national stage entry of PCT/US2017/028659, filed on Apr. 20, 2017, which claims the benefit of and priority to U.S. Provisional Patent Application No. 62/325,721 filed on Apr. 21, 2016, the entire disclosure disclosures of which are incorporated by reference herein.

BACKGROUND

The present disclosure relates to fuel cell systems. In particular, the present disclosure relates to a fuel cell system design that is intended to reduce cathode gas flow pressure drops in high cathode gas flow fuel cell systems, and manifold designs with an add-on stiffener to allow higher pressure capability.

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air.

Fuel cells are typically arranged in a stacked relationship. A fuel cell stack includes many individual cells positioned between a fixed end plate and a free end plate. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds. Such manifolds are typically used in Molten Carbonate Fuel Cells (MCFC) which operate at approximately 650° C. During operation of MCFCs, the fuel cells can move relative to the manifolds.

Conventional fuel cells typically include an anode and a cathode separated by an electrolyte contained in an electrolyte matrix. The anode, the cathode, the electrolyte and the electrolyte matrix are disposed between a first collector and a second collector, with the first collector adjacent the anode and the second collector adjacent the cathode. Fuel flows to the anode via the first collector and an oxidant flows to the cathode via the second collector. The fuel cell oxidizes the fuel in an electrochemical reaction which releases a flow of electrons between the anode and cathode, thereby converting chemical energy into electrical energy.

The fuel cells described above can be stacked in series with separator plates disposed between adjacent fuel cells and end plates (e.g., a fixed end plate and a free end plate) disposed on opposing ends of the fuel cell stack. Fuel cells are stacked to increase the electrical energy they produce. Fuel cell stacks have a negative side with a negative end cell and a positive side with a positive end cell.

New variants of MCFC fuel cell systems require cathode gas flows that are two to four times greater than typical. Due to the compact design of the fuel cell systems currently offered, space is not available to provide significantly larger amounts of flow area. In addition, to control the uniformity of flow to each cell in the fuel cell stacks, the gas flow rate through the manifold and the location of the gas flow exits have to be carefully considered.

A need exists for improved technology, including technology related to controlling the uniformity of flow to each cell in the fuel cell stack, and stiffening or reinforcing the manifolds of the fuel cell stack. In particular, technology related to a fuel cell system design for reducing cathode gas flow pressure drops in high cathode gas flow fuel cell systems, and manifold designs with an add-on stiffener to allow higher pressure capability.

SUMMARY

In certain embodiments, a fuel cell system includes a fuel cell stack including of a plurality of fuel cells positioned between opposing end plates; an anode manifold configured to direct anode gas into or out of the fuel cell stack; a cathode manifold configured to direct cathode gas into or out of the fuel cell stack; and at least one truss attached to an external surface of at least one of the cathode manifold or the anode manifold. The at least one truss is configured to reinforce the fuel cell system.

In some aspects, the fuel cell system includes a plurality of tie rods arranged around an exterior of the fuel cell system.

In some aspects, the at least one truss includes a plurality of projecting portions provided along a length of an upper surface of the at least one truss and a lower surface of the at least one truss, at least one recessed portion in the upper surface of the at least one truss, and at least another recessed portion in the lower surface of the at least one truss; the recessed portion in the upper surface of the at least one truss is aligned with the recessed portion in the lower surface of the at least one truss; the recessed portion in the upper surface of the at least one truss is aligned with the recessed portion in the lower surface of the at least one truss; and the recessed portion in the upper surface of the at least one truss and the recessed portion in the lower surface of the at least one truss are configured to receive a tie rod therethrough.

In some aspects, the projecting portions provided on the upper surface of the at least one truss and the projecting portions provided on the lower surface of the at least one truss extend in the same direction.

In some aspects, the projecting portions provided on the upper surface of the at least one truss extend in an opposite direction as a direction in which the projecting portions provided on the lower surface of the at least one truss extend.

In some aspects, the fuel cell system further includes at least one connector configured to attach the at least one truss to the external surface of at least one of the cathode manifold or the anode manifold. The connector includes at least one slot configured to receive a projecting portion of the at least one truss.

In some aspects, the connector includes a plurality of slots provided along a length thereof, each of the slots configured to receive one of the projecting portions of the at least one truss.

In some aspects, the connector is a T-shaped connector or an L-shaped connector.

In some aspects, the connector is welded to the external surface of at least one of the cathode manifold or the anode manifold.

In some aspects, the fuel cell system further includes at least a first connector and a second connector configured to attach the at least one truss to the external surface of at least one of the cathode manifold or the anode manifold. The first connector and the second connector are provided at different heights. The first connector includes at least one slot configured to receive a projecting portion provided on the upper surface of the at least one truss. The second connector includes at least one slot configured to receive a projecting portion provided on the lower surface of the at least one truss.

In some aspects, the fuel cell system further includes a first locking plate secured to a surface of the first connector, the first locking plate configured to strengthen a connection between the at least one truss and the first connector; and a second locking plate secured to a surface of the second connector, the second locking plate configured to strengthen a connection between the at least one truss and the second connector.

In some aspects, each of the first locking plate and the second locking plate includes an aperture at one or both of a proximal end and a distal end thereof, and one or more bent tabs along a length thereof; and the one or more bent tabs are configured such that in operation, the one or more bent tabs are folded back towards a respective one of the first connector and the second connector to prevent a respective one of the first locking plate and the second locking plate from slipping out of the respective one of the first connector and the second connector.

In some aspects, the fuel cell system further includes a fastener configured to be received in a portion of the at least one truss, a portion of the respective one of the first connector and the second connector, and the aperture of the respective one of the first locking plate and the second locking plate. The fastener is configured to further strengthen the connection between the at least one truss, the respective one of the first connector and the second connector, and the respective one of the first locking plate and the second locking plate. The fastener may be a clevis pin.

In some aspects, the fuel cell system further includes at least one bracket configured to attach the at least one truss to the external surface of the at least one of the cathode manifold or the anode manifold. The bracket includes at least one slot configured to receive a projecting portion of the at least one truss.

In some aspects, the fuel cell system further includes a first bracket and a second bracket configured to attach the at least one truss to the external surface of the at least one of the cathode manifold or the anode manifold. The first bracket and the second bracket are provided at different heights. The first bracket includes at least one slot configured to receive a projecting portion provided on the upper surface of the at least one truss, and the second bracket includes at least one slot configured to receive a projecting portion provided on the lower surface of the at least one truss.

In some aspects, an upper surface of the at least one truss rests upon an upper surface of the first bracket, a lower surface of the at least one truss rests upon an upper surface of the second bracket, and the first bracket and the second bracket are immediately adjacent each other without another bracket intervening therebetween.

In some aspects, the fuel cell system further includes a first locking plate secured to a surface of the first bracket, the first locking plate configured to strengthen a connection between the at least one truss and the first bracket; and a second locking plate secured to a surface of the second bracket, the second locking plate configured to strengthen a connection between the at least one truss and the second bracket.

In some aspects, each of the first locking plate and the second locking plate comprises an aperture at one or both of a proximal end and a distal end thereof, and one or more bent tabs along a length thereof; and the one or more bent tabs are configured such that in operation, the one or more bent tabs are folded back towards a respective one of the first bracket and the second bracket to prevent a respective one of the first locking plate and the second locking plate from slipping out of the respective one of the first bracket and the second bracket.

In some aspects, the fuel cell system further includes a fastener configured to be received in a portion of the at least one truss, a portion of the respective one of the first bracket and the second bracket, and the aperture of the respective one of the first locking plate and the second locking plate. The fastener is configured to further strengthen the connection between the at least one truss, the respective one of the first bracket and the second bracket, and the respective one of the first locking plate and the second locking plate. The fastener may be a clevis pin.

In some aspects, each of the opposing end plates is a flow-through end plate configured to collect at least one of cathode gas from the fuel cell stack that flows through the cathode manifold or anode gas from the fuel cell stack that flows through the anode manifold.

In some aspects, each of the opposing end plates is a flow-through end plate configured to collect cathode gas from the fuel cell stack that flows through the cathode manifold.

In some aspects, each of the opposing end plates is a flow-through end plate configured to collect anode gas from the fuel cell stack that flows through the anode manifold.

In some aspects, the fuel cell system further includes a plurality of springs, each spring located at a base of one of the tie rods. The tie rods are configured such that in operation the tie rods pull down and compress the fuel cell stack via the springs.

In some aspects, at least one of the cathode manifold or the anode manifold contacts an exterior surface of the fuel cell stack.

In some aspects, at least one of the cathode manifold or the anode manifold does not contact an exterior surface of the fuel cell stack such that a gap exists between the fuel cell stack and the at least one of the cathode manifold or the anode manifold.

In some aspects, at least one of the cathode manifold or the anode manifold is disposed within a perimeter defined by the tie rods.

In some aspects, at least one of the cathode manifold or the anode manifold extends beyond a perimeter defined by the tie rods such that a volume of the at least one of the cathode manifold or the anode manifold is increased; and the at least one of the cathode manifold or the anode manifold includes at least one clearance extending therethrough in a height direction, the at least one clearance configured to receive a tie rod such that the tie rod extends through the at least one of the cathode manifold or the anode manifold.

In some aspects, the fuel cell system further includes at least one external duct that projects from at least one of the cathode manifold or the anode manifold in a direction extending away from the fuel cell stack. The at least one external duct is configured such that in operation, a flow rate of the cathode gas or the anode gas removed from the fuel cell system via the at least one external duct is increased.

In some aspects, the fuel cell system further includes a plurality of external ducts extending along a height of at least one of the cathode manifold or the anode manifold and in a direction extending away from the fuel cell stack. The plurality of external ducts are configured such that in operation, a flow rate of the cathode gas or the anode gas removed from the fuel cell system via the plurality of external ducts is increased.

In some aspects, the fuel cells in the fuel cell stack are high-temperature fuel cells. The fuel cells may be molten carbonate fuel cells.

In some aspects, the fuel cell system further includes a duct connected to one of the opposing end plates, and an expansion joint connected to the duct. The expansion joint may a pre-stretched expansion joint. The pre-stretched expansion joint may be a pre-stretched bellows.

In some aspects, the fuel cell system further includes a first duct connected to a first one of the opposing end plates; a second duct connected to a second one of the opposing end plates; and an expansion joint connected to the first duct or the second duct. The expansion joint may a pre-stretched expansion joint. The pre-stretched expansion joint may be a pre-stretched bellows.

In some aspects, the fuel cell system further includes a first duct connected to a first one of the opposing end plates; a second duct connected to a second one of the opposing end plates; a first expansion joint connected to the first duct; and a second expansion joint connected to the second duct. The at least one of the first expansion joint or the second expansion joint may be a pre-stretched expansion joint. The pre-stretched expansion joint is a pre-stretched bellows.

One of ordinary skill in the art would appreciate that the aspects described above are not mutually exclusive and may be combined.

These and other advantageous features will become apparent to those reviewing the disclosure and drawings.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

FIG. 12A is a close up view of the brackets of FIG. 11A. As seen in FIG. 12A, each of the brackets includes a projecting portion having a plurality of slots configured to receive a portion of the truss.

FIG. 12B shows a plurality of trusses, for example, the truss of FIGS. 8A-8E attached to the plurality of brackets of FIG. 11A.

FIG. 13A shows the connection between the truss and the projecting portion of the bracket of FIG. 11B.

FIG. 13B shows a locking plate configured to further strengthen the connection between the truss and the projecting portion of the bracket of FIG. 13A.

FIG. 13C is a close up view of the locking plate of FIG. 13B at a section I.

FIG. 13D shows the connection between the truss, the projecting portion of the bracket, and the locking plate of FIGS. 13B and 13C.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1A:
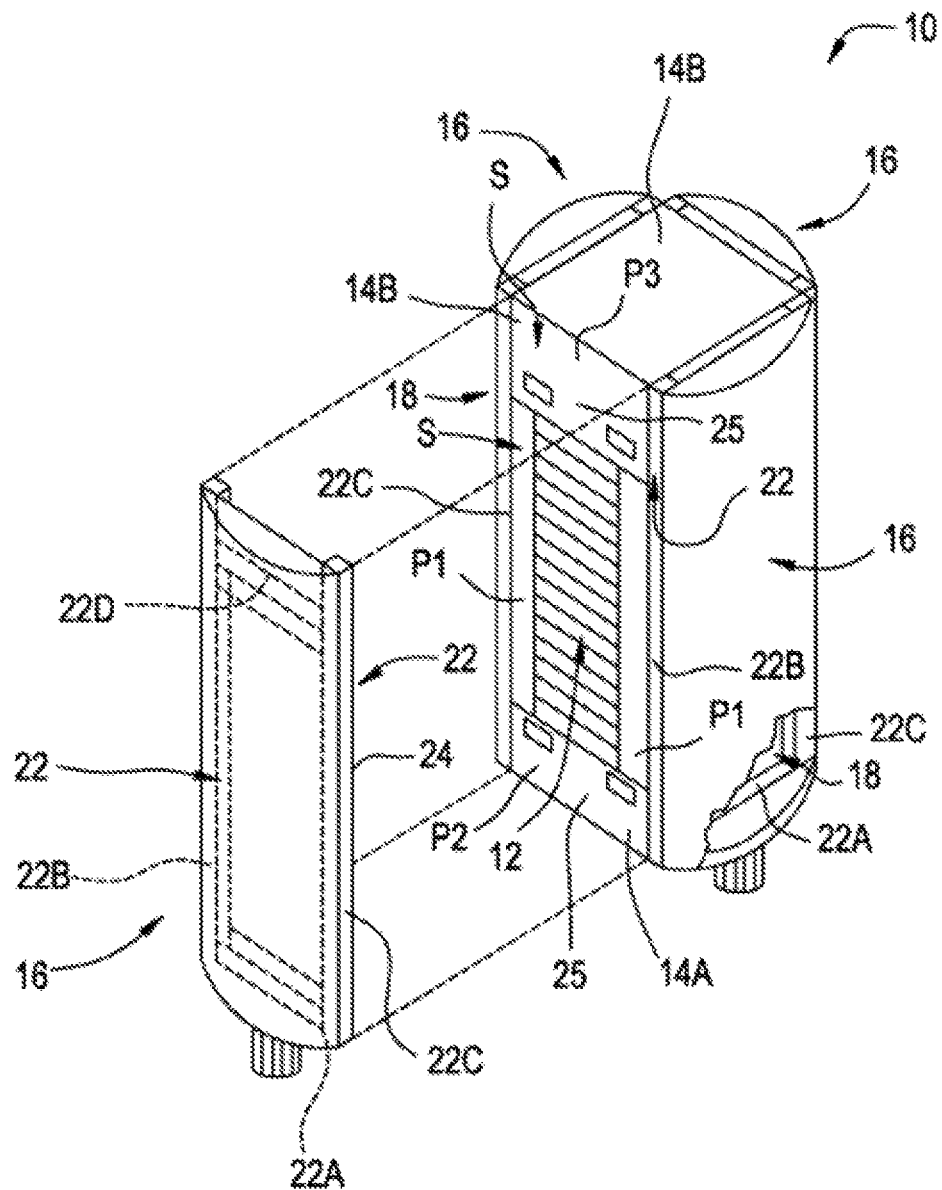
FIG. 1A is a perspective view of a fuel cell system with three manifolds secured thereto and one manifold disassembled therefrom.
Figure 1B:
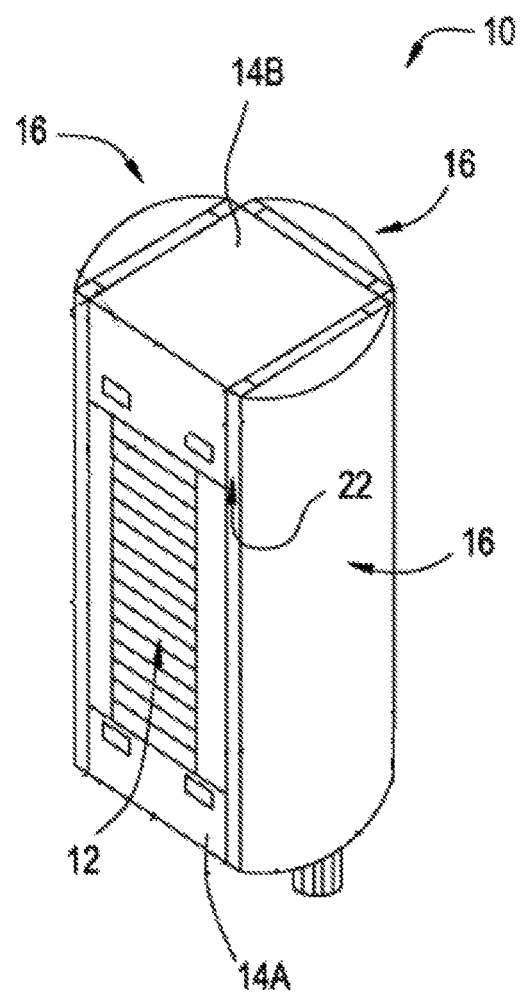
FIG. 1B is a perspective view of a fuel cell system with three manifolds secured thereto. In this example, the fourth side is formed by the enclosure such that cathode inlet gas envelopes the entire stack.

Referring to FIGS. 1A and 1B, a fuel cell system, generally designated by the numeral 10 includes a Molten Carbonate Fuel Cell (MCFC) stack 12 positioned between opposing end plates 14A and 14B. Each of the fuel cells in the stack 12 includes an anode and a cathode.

In the example of FIG. 1A, a manifold 16 is shown positioned on three of four outwardly facing surfaces 18 of the fuel cell system 10 for directing a fluid such as fuel (i.e., anode gas) or an oxidant (i.e., cathode gas) into or out of the fuel cell stack. One of the manifolds 16 is shown removed from the outwardly facing surface 18 to illustrate the stack 12 and outward facing surface 18. When assembled, all four manifolds 16 are positioned on one of the respective outwardly facing surfaces 18. A generally rectangular sealing area S extends around a peripheral portion of each of the outwardly facing surfaces 18. The sealing area S is defined by a peripheral area P1 of the fuel cell stack and portions P2 and P3 of the endplates 14A and 14B, respectively. Each of the manifolds 16 has a portion thereof secured or tethered to a portion of the portion P2 of the end plate 14A. For example, movement of the manifolds 16 may be limited via a bracket that has a clearance of about ±⅛". During operation of the fuel cell system 10, each of the manifolds 16 is moveable relative to the portions P1 and P3 of the respective sealing area S, for example, parallel to the X, Y and/or Z axes.

The fuel cell system 10 of FIG. 1B is structurally the same as the fuel cell system 10 of FIG. 1A, except that the fuel cell system 10 of FIG. 1B only includes three manifolds 16. In the example of FIG. 1B, the fourth side is formed by the enclosure itself, as opposed to a separate manifold, such that cathode inlet gas envelops the entire stack. In variants of MCFC fuel cell systems that only include three manifolds, a larger pressure differential may be created. For clarity, some of the structural details have been omitted from FIG. 1B, but are described with respect to FIG. 1A.

While in the examples above the fuel cell system 10 is described as having four outwardly facing surfaces 18, with each having a generally rectangular sealing area S, the concepts disclosed in the present application are not necessarily limited in this regard. While the fuel cell system 10 is described as including a MCFC stack, the concepts disclosed herein may be employed on fuel cell systems having other types of fuel cell stacks.

Each of the manifolds 16 includes a manifold seal. Each manifold seal includes a manifold frame 22 defining a mating surface 24. The mating surface 24 sealingly engages the sealing area S. The manifold frame 22 is manufactured from four sections 22A, 22B, 22C and 22D of a dielectric material to prevent electrical short circuiting between individual cells of the fuel cell stack 12. One section 22A of each of the manifold frames 22 is secured to the outwardly facing surface 25 of the end plate 14A to restrain movement of the section 22A in a direction along the Z axis. The end plate 14A is fixed to a support structure (not shown). The manifold seal 20 also includes a gasket formed into a shape that is complementary to the manifold frame 22 and disposed between the mating surface 24 and the sealing area S.

While the manifold frame 22 is described as being manufactured from four sections of a dielectric material, the concepts disclosed herein are not limited in this regard as other materials can also be employed and the manifold frame and/or sections 22A, 22B, 22C and 22D can be manufactured in any number of sections without departing from the broader aspects of concepts disclosed herein. For example, the manifold frame 22 may be metal with separate, dielectric components mounted to the metal frame. Moreover, there may be many sections of dielectric material on a single manifold frame 22, and therefore, the presently disclosed concepts are not limited to only four sections of dielectric material.

Figure 2:
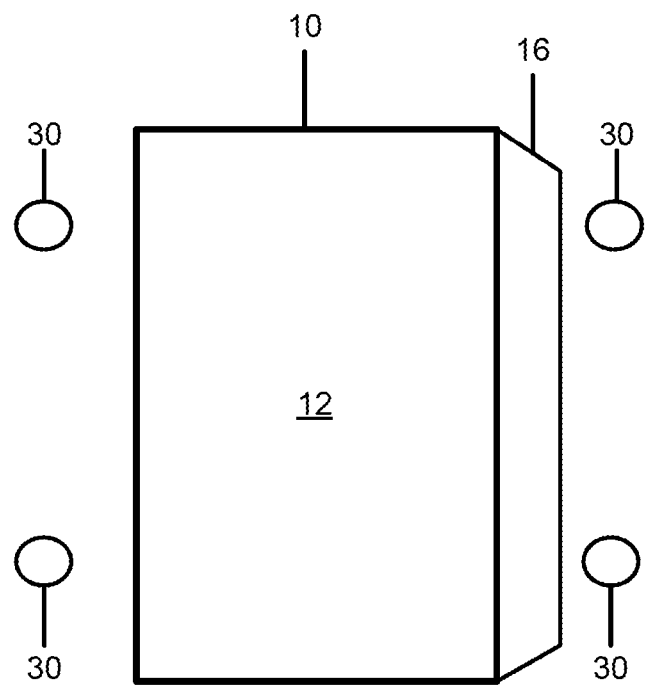
FIG. 2 is a schematic top view of the fuel cell system including a plurality of tie rods.

Referring now to FIG. 2, a top view of the fuel cell system 10 is schematically illustrated. For structural support, the fuel cell system 10 further includes a plurality of compression system tie rods 30 positioned around a periphery of the fuel cell system 10. The tie rods 30 hold the stack 12 of the fuel cell system 10 together. The tie rods 30 may be provided, for example, at a distance of 1-1.5 inches from an external surface of any of the manifolds 16 of the fuel cell system 10. Due to the location of the tie rods 30, the manifolds 16 of the fuel cell system 10 cannot simply be expanded to accommodate the increased cathode gas flow rate. While the fuel cell system 10 is described as having four tie rods 30, the concepts disclosed herein are not limited in this regard. Any number of tie rods 30 may be used. The tie rods 30 are configured to pull down and compress the stack 12 via a spring at the bottom of each tie rod 30 (see FIG. 10).

Figure 3:
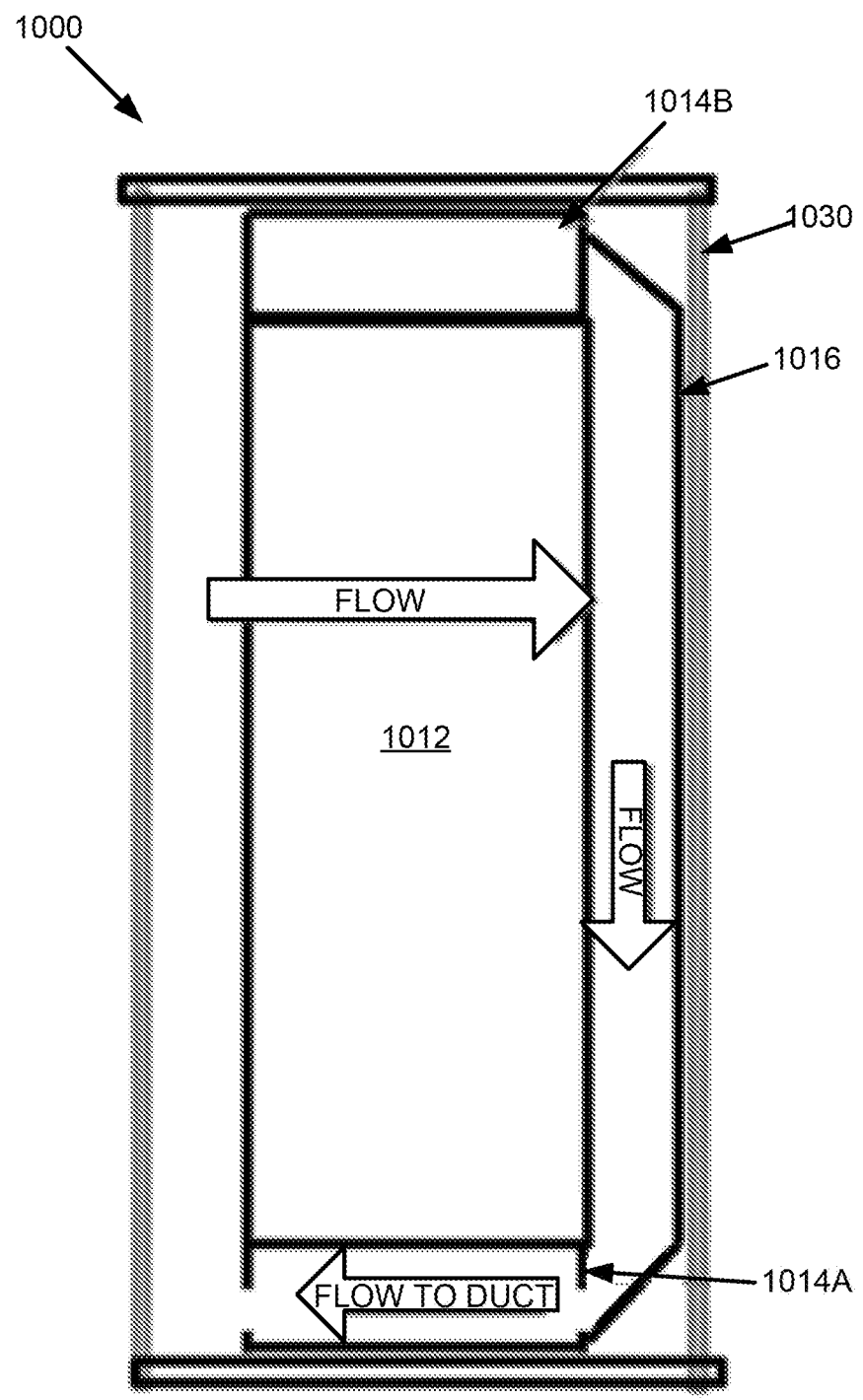
FIG. 3 is a schematic side, cross-sectional view of a prior art fuel cell system including a single flow-through end plate.

Referring now to FIG. 3, a side, cross-sectional view of a prior art fuel cell system is schematically illustrated. In particular, the flow arrows of FIG. 3 illustrate the flow across the cathode of the fuel cell stack 1012, down through the cathode manifold 1016 and back through the end plate 1014A to a duct (not illustrated). In the embodiment of FIG. 3, the top end plate 1014B is solid or otherwise closed off from the manifold 1016, while the bottom end plate 1014A is a flow through end plate. Thus, FIG. 3 illustrates a prior art fuel cell system 1010 having a single flow-through end plate 1014A disposed at one end of the cathode manifold 1016 to collect gas coming from the fuel cell stack 1012. The top end plate 1014B is solid or otherwise closed off from the manifold 1016, while the bottom end plate 1014A is a flow through end plate.

In the embodiment of FIG. 3, it is expected that, during operation, there will be a disparity of gas flow in the cells of the stack 1012 from the top to the bottom of the stack 1012. In particular, the cathode gas flow would be higher at the end of the stack 1012 that is closer to the single flow-through end plate. As illustrated in FIG. 3, the cathode gas flow would be expected to be higher towards the bottom of the stack 1012. As discussed above, new fuel cell systems such as MCFCs require cathode gas flows that are two to four times greater than what would typically be used. The disparity of gas flow would be expected to become more pronounced as the overall cathode gas flow through the stack 1012 is increased if the manifold volume remains unchanged.

Figure 4:
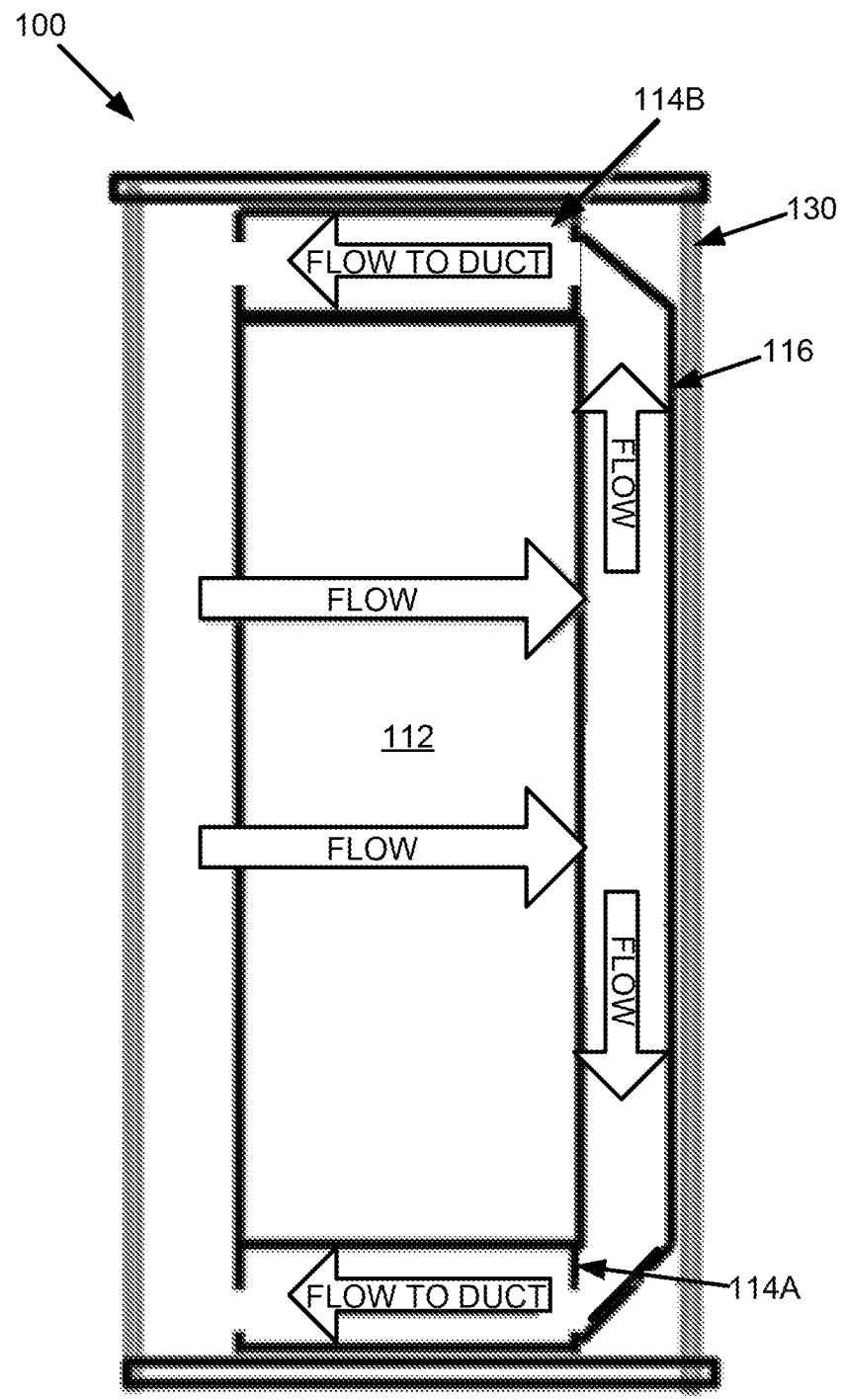
FIG. 4 is a schematic side, cross-sectional view of a fuel cell system according to embodiments of the present application including two flow-through end plates.

Referring now to FIG. 4, a side, cross-sectional view of the fuel cell system 100 according to some embodiments of the present application is schematically illustrated. In particular, the flow arrows of FIG. 4 illustrate the flow across the cathode of the fuel cell stack 112, bi-directional flow upwards and downwards through the cathode manifold 116 and back through the end plates 114A and 114B to a duct (not illustrated). FIG. 4 illustrates an embodiment of the fuel cell system 100 having two flow-through end plates 114A and 114B disposed at opposite ends of the cathode manifold 16 to collect gas coming from the fuel cell stack 112.

The two flow-through end plates 114A and 114B of the embodiment of FIG. 4 allow gas flow rates that are at least double the gas flow rate that would be possible in the embodiment of FIG. 3. In other words, at least double the gas flow rate could be removed from the fuel cell system 10 without decreasing the uniformity of the cathode gas flow beyond known operating experience. Thus, a pressure drop in the cathode gas flow of a high cathode gas flow fuel cell system can be reduced. In FIG. 4, the gas flow rate would be higher at locations closer to the end plates 114A and 114B, and lowest at the center height of the fuel cell stack 112. However, the lowest gas flow rate in the embodiment of FIG. 4 would be approximately equal to the lowest gas flow rate in the embodiment of FIG. 3, which includes a single flow-through end plate and half of the total gas flow.

Figure 5:
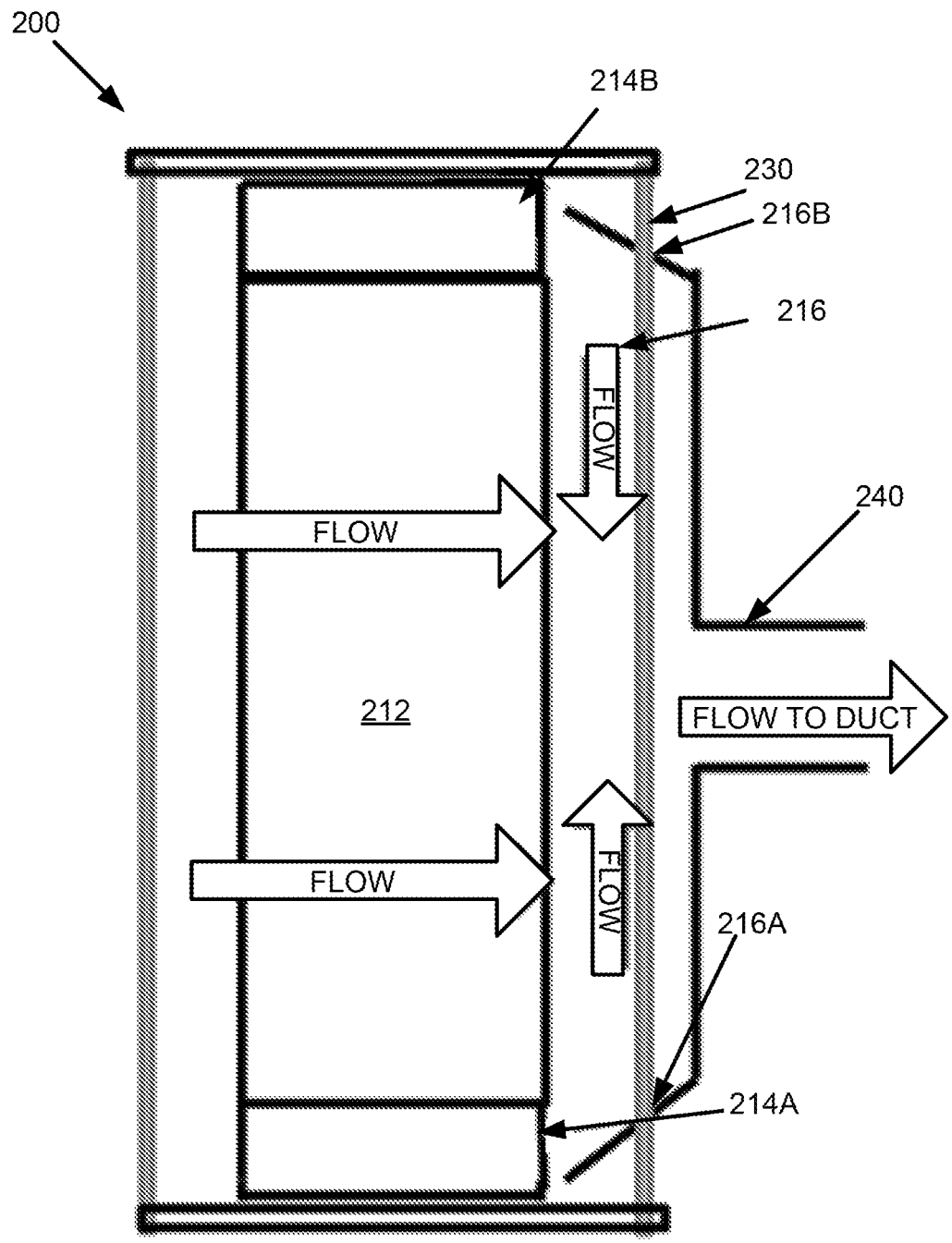
FIG. 5 is a schematic side, cross-sectional view of a fuel cell system according to embodiments of the present application including a deeper manifold that does not contact a stack face and clearance for a tie rod.

Referring now to FIG. 5, a side, cross-sectional view of the fuel cell system 200 is schematically illustrated. In the embodiment of FIG. 5, the cathode manifold 216 has been extended outwards and an external duct 240 has been added. The duct 240 projects from the cathode manifold 216 in a direction extending away from the stack 212. The cathode manifold 216 has a larger volume (as compared to the cathode manifolds illustrated in FIGS. 3 and 4). The increased volume of the cathode manifold 16 allows the fuel cell system to accommodate an increased cathode gas flow rate.

Unlike the cathode manifolds illustrated in FIGS. 3 and 4, the cathode manifold 216 of FIG. 5 has no contact with a surface of the stack 212, and is therefore a non-sealed manifold. A predetermined amount of leakage between the non-sealed manifold and the stack 212 is acceptable. Depending on the gas flow rate, a gap size and/or pressure difference can be manipulated to keep the leakage within an acceptable range, for example, on a percentage basis.

Moreover, unlike the cathode manifolds illustrated in FIGS. 3 and 4, the cathode manifold 216 of FIG. 5 has at least two apertures 216A, 216B configured to receive a tie rod 230 extending through the cathode manifold 216 in a height direction. The number of apertures corresponds to the number of tie rods 230 extending through the cathode manifold 16.

Although the duct 240 is illustrated as projecting from roughly the center of the cathode manifold 216, the position of the duct 240 may be varied such that the duct 240 projects from the manifold 216 at other locations (e.g., heights). In some embodiments, the duct 240 may project from the cathode manifold 216 at a location that is closer to the end plate 214B. In other embodiments, the duct 240 may project from the cathode manifold 216 at a location that is closer to the end plate 214A.

Although both end plates 214A and 214B are illustrated as solid or otherwise closed off from the manifold 216, the concepts disclosed herein not limited in this regard. One or both of the end plates 214A and 214B may be a flow through end plate.

Figure 6:
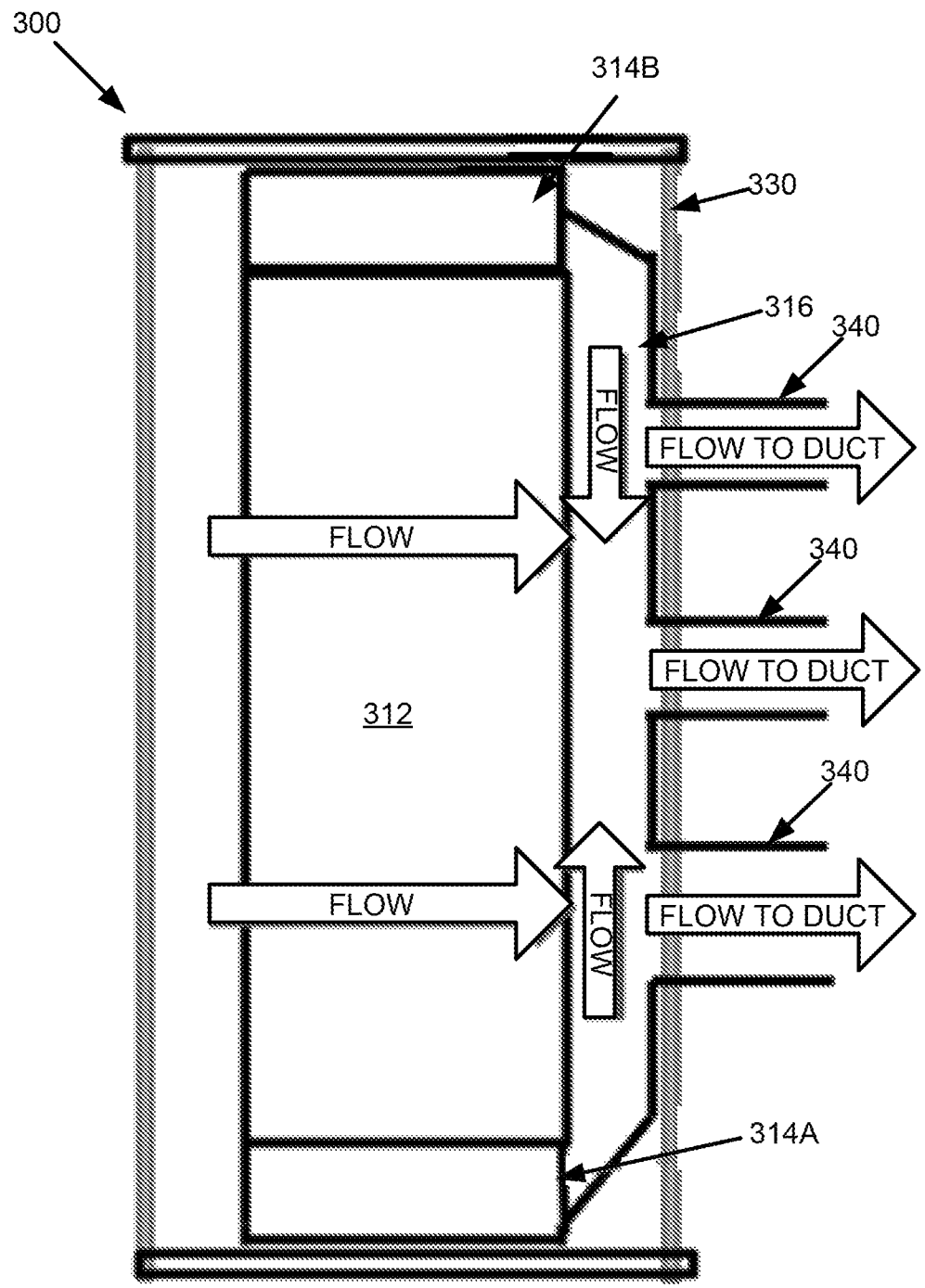
FIG. 6 is a schematic side, cross-sectional view of a fuel cell system according to embodiments of the present application including a plurality of external ducts.

Referring now to FIG. 6, a side, cross-sectional view of the fuel cell system 300 is schematically illustrated. Like the embodiments of FIGS. 3 and 4, in the embodiment of FIG. 6, the manifold is in contact with a surface of the stack 312. In the embodiment of FIG. 6, a plurality of external ducts 340 are provided at different positions along a height of the cathode manifold 316. Each of the ducts 340 project from the cathode manifold 316 in a direction extending away from the stack 312. In addition, the provision of the ducts 340 allows an increased cathode gas flow rate to be removed from the fuel cell system 300 without decreasing the uniformity of the cathode gas flow beyond known operating experience. Thus, a pressure drop in the cathode gas flow of a high cathode gas flow fuel cell system can also be reduced.

Although three ducts 340 are illustrated, the concepts disclosed herein are not limited in this regard. Any number of ducts 340 equal to or greater than two may be provided. In some embodiments, the ducts 340 may be spaced equidistantly from each other (as illustrated in FIG. 6). In other embodiments, the spacing between adjacent ducts 40 may vary.

Although both end plates 314A and 314B are illustrated as solid or otherwise closed off from the manifold 316, the concepts disclosed herein are not limited in this regard. One or both of the end plates 314A and 314B may be a flow through end plate.

Figure 7:
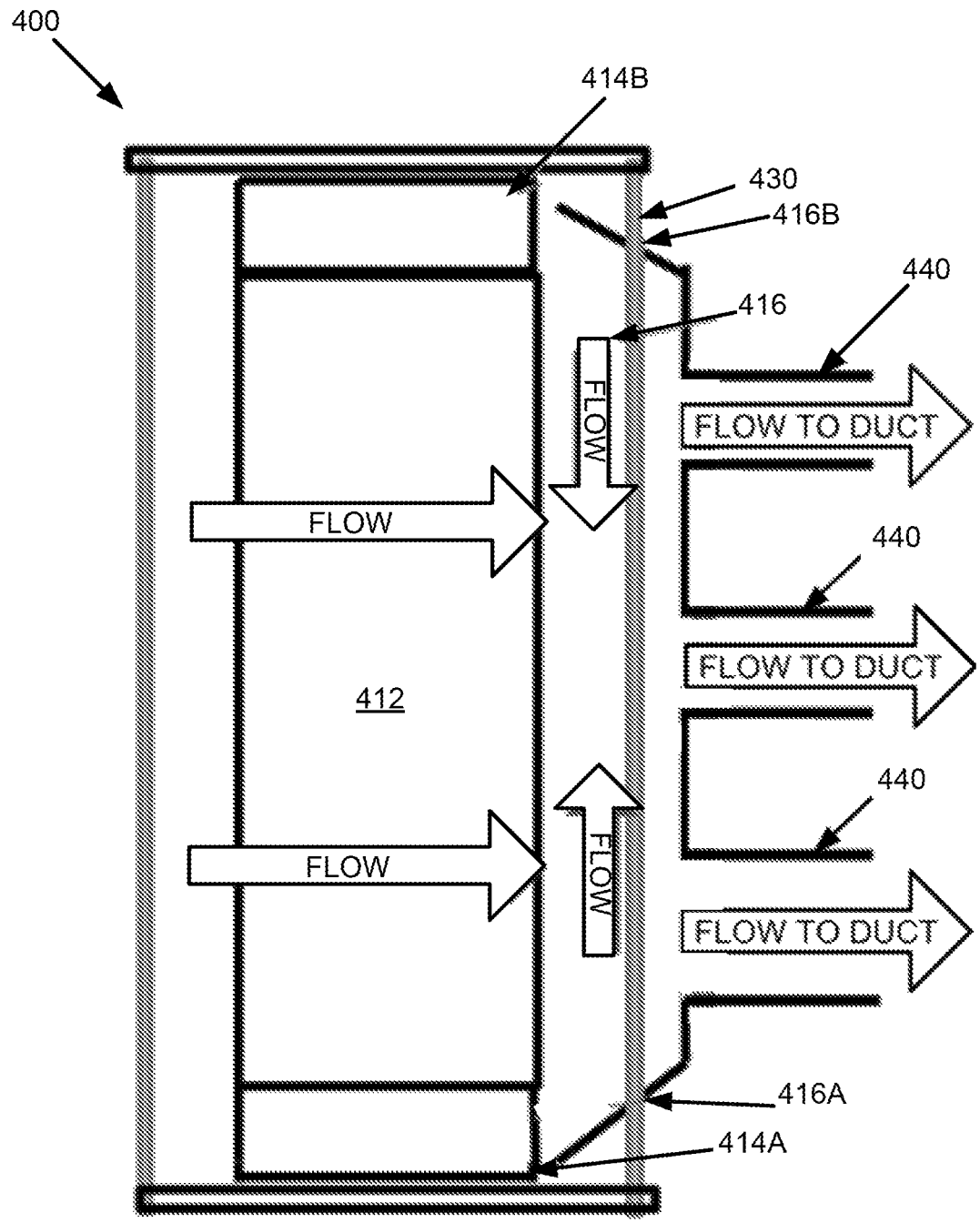
FIG. 7 is a schematic side, cross-sectional view of a fuel cell system according to embodiments of the present application including a deeper manifold that does not contact a stack face and clearance for a tie rod, and a plurality of external ducts.

Referring now to FIG. 7, a side, cross-sectional view of the fuel cell system 400 is schematically illustrated. In the embodiment of FIG. 7, the cathode manifold 416 has been extended outwards and a plurality of external ducts 440 are provided at different positions along a height of the cathode manifold 416. Each of the ducts 440 project from the cathode manifold 416 in a direction extending away from the stack 412. The cathode manifold 416 has a larger volume (as compared to the cathode manifolds illustrated in FIGS. 3 and 4). The increased volume of the cathode manifold 416 allows the fuel cell system to accommodate an increased cathode gas flow rate. In addition, the provision of the ducts 440 allows an increased cathode gas flow rate to be removed from the fuel cell system 410 without decreasing the uniformity of the cathode gas flow beyond known operating experience. Thus, a pressure drop in the cathode gas flow of a high cathode gas flow fuel cell system can also be reduced.

Like the cathode manifold 216 of FIG. 5, the cathode manifold 416 of FIG. 7 has no contact with a surface of the stack 412, and is therefore, a non-sealed manifold. In addition, the cathode manifold 416 of FIG. 7 has at least two apertures 416A, 416B configured to receive a tie rod 430 extending through the cathode manifold 416 in a height direction. The number of apertures corresponds to the number of tie rods 430 extending through the cathode manifold 416.

Although three ducts 440 are illustrated, the concepts disclosed herein are not limited in this regard. Any number of ducts 440 equal to or greater than two may be provided. In some embodiments, the ducts 440 may be spaced equidistantly from each other (as illustrated in FIG. 7). In other embodiments, the spacing between adjacent ducts 440 may vary.

Although both end plates 414A and 414B are illustrated as solid or otherwise closed off from the manifold 416, the concepts disclosed herein are not limited in this regard. One or both of the end plates 414A and 414B may be a flow through end plate.

Higher anode and cathode gas flow rates require manifold designs to be stiffened in order to handle the larger pressure differential created by the higher flows. Referring now to FIGS. 8A-8D, to stiffen or reinforce any of the fuel cell systems 10, 100, 200, 300, 400, 500 or 1000 one or more trusses 50 (i.e., at least one truss) may be added to any of the embodiments described above. The trusses 50 may be attached to an external surface of any of the manifolds 16, 116, 216, 316, 416, 516 or 1016 of the fuel cell systems (manifold 16 is used for illustration purposes in FIG. 8A-8E). The trusses 50 prevent the manifold 16 from collapsing inwards due to negative pressure. The trusses 50 also decrease the load on the manifold 16.

Figure 8A:
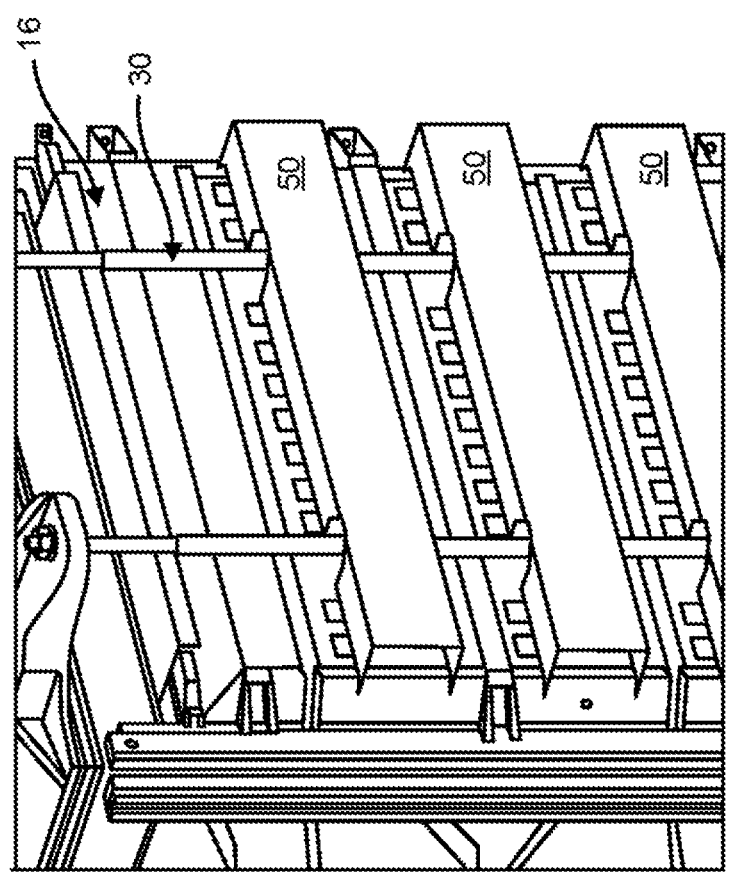
FIG. 8A shows a plurality of trusses attached to an external surface of a manifold to provide structural stiffness to the manifold according to embodiments of the present application.
Figure 8C:
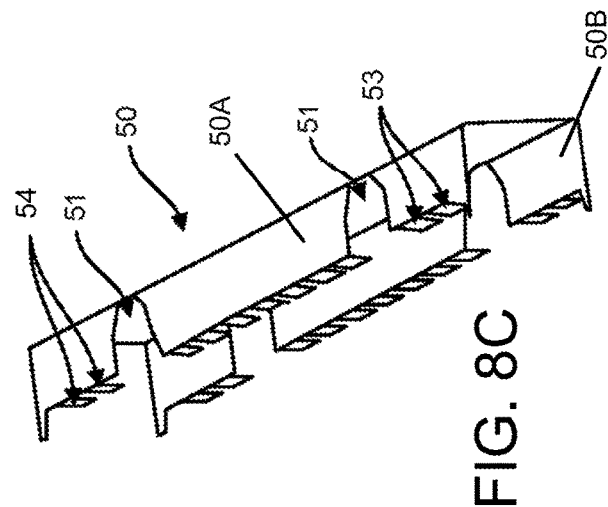
FIG. 8C is another view of the truss of FIG. 8A in which protrusions of an upper surface and a lower of the truss extend in a same direction.

Each of the trusses 50 includes at least one recessed portion 51 at an upper surface 50A and a lower surface 50B thereof (see FIG. 8C) The recessed portion 51 is configured to receive a tie rod 30 (see FIG. 8A). Each of the trusses 50 further includes a plurality of projecting portion 52. As illustrated in FIGS. 8B and 8C, the plurality of projecting portions 52 may be provided along an entire length of each truss 50 (except at the recessed portion(s) 51). According to other exemplary embodiments, the plurality of projecting portions 52 may be provided only at certain portions of the length of each truss 50, for example, at end portions 53 and 54. In some embodiments, the projecting portions 52 may be equidistant from each other. In other embodiments, a distance between adjacent projecting portions 52 may vary.

As illustrated in FIG. 8C, all of the projecting portions 52 extend in the same direction (i.e., downwards). However, the concepts disclosed herein are not limited in this regard. In other examples, all of the projecting portions 52 may extend upwards. In other examples, the projecting portions 52 of the upper surface 50A may extend in a direction opposite to the direction in which the projecting portions 52 of the lower surface 50B extend. For example, as illustrated in FIG. 8D, the projecting portions 52 of the upper surface 50A may extend upwards, while the projecting portions 52 of the lower surface 50A may extend downwards. In other examples (not illustrated) the projecting portions 52 of the upper surface 50A may extend downwards, while the projecting portions 52 of the lower surface 50B may extend upwards.

Although three trusses 50 are attached to the manifold 16 in FIG. 8A, the concepts disclosed herein are not limited in this regard. Any suitable or desired number of trusses 50 may be attached along the height of the manifold 16.

The truss 50 may be permanently attached to an external surface of any of the manifolds 16 of the fuel cell system 10. Alternatively, the truss 50 may be removably attached to an external surface of any of the manifolds 16 of the fuel cell system 10, to allow for easy replacement of the truss 50.

Figure 8E:
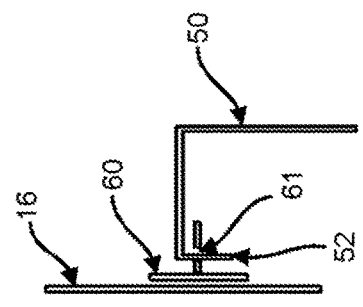
FIG. 8E illustrates a connector configured to connect the truss of FIG. 8A to the external surface of the manifold.
Figure 8B:
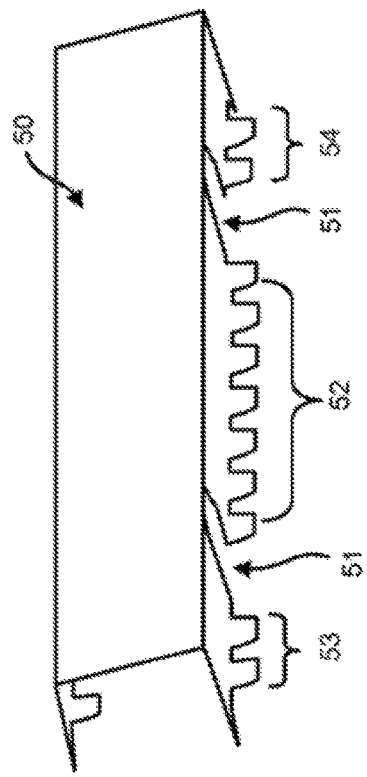
FIG. 8B is a view of the truss of FIG. 8A.
Figure 8D:
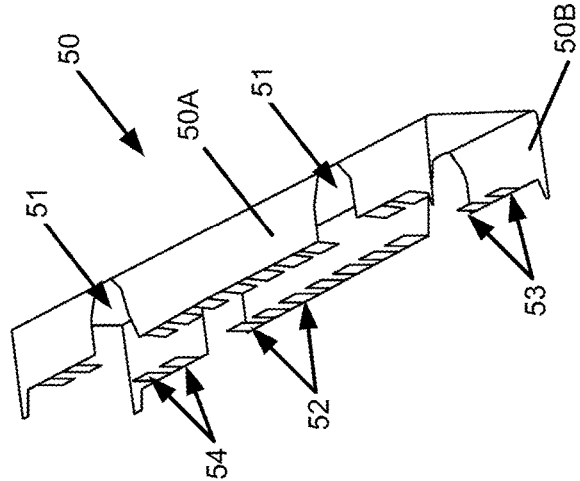
FIG. 8D is another view of the truss of FIG. 8A in which protrusions of an upper surface and a lower of the truss extend in opposite directions.
Figure 11A:
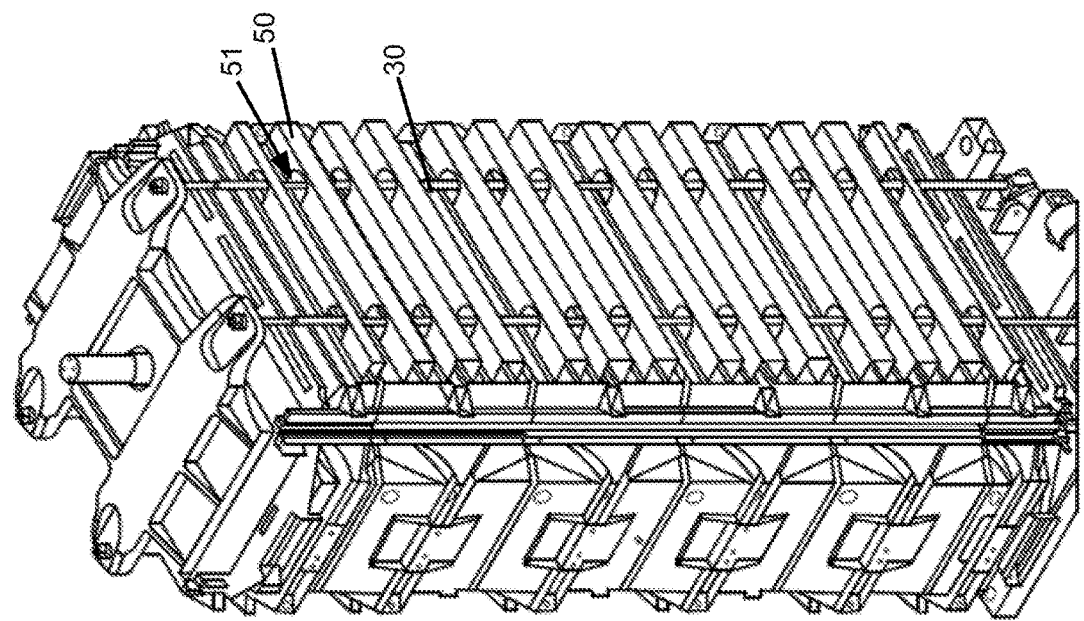
FIG. 11A shows a plurality of brackets attached to an external surface of a manifold according to embodiments of the present application. The brackets are configured to connect a plurality of trusses to the external surface of the manifold to provide structural stiffness to the manifold.
Figure 11B:
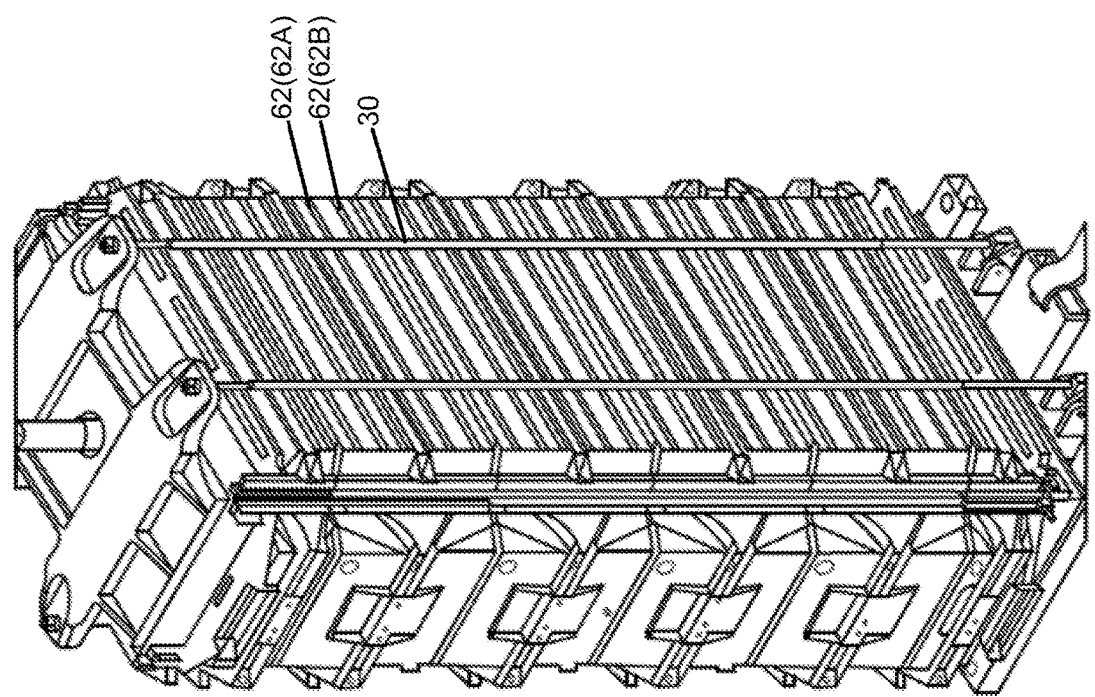
FIG. 11B shows a plurality of trusses of FIG. 8A attached to the external surface of the manifold via the plurality of brackets of FIG. 11A.

As illustrated in FIG. 8E, a connector 60 including a plurality of slot 61 along a length thereof may be welded to an external surface of the manifold 16. Multiple connectors 60 may be provided along a height of the stack in an arrangement similar to that of the brackets 62 of FIG. 11A. Each slot 61 is configured to receive a projecting portion 52 of the truss 50. The connector 60 may be provided as a single piece or as a plurality of pieces, depending on manufacturing requirements. The connector 60 and the trusses 50 may be made from the same material or from different materials. The connector 60 and the trusses 50 may be made, for example, of sheet metal. In one example, the connector 60 and the trusses 50 may be made of stainless steel sheet metal. However, the concepts disclosed herein are not limited in this regard. Any material may be used provided it satisfies the temperature requirements of the fuel cell system. As illustrated in FIG. 8E, the connector 60 is a tee connector (i.e., T-shaped connector), but the concepts disclosed herein are not limited in this regard. Other connector shapes may be used such as an L-shape connector, provided the connector has a slot configured to receive the projecting portion of the truss.

Instead of using the connector 60, as seen in FIGS. 12A and 12B, one or more brackets 62 may be welded to the cathode manifold 16 and used to connect the truss 50 to the cathode manifold 16. For example, the brackets 62 may be provided in rows along a height of the fuel cell stack 12. The brackets 62 and the trusses 50 may be made from the same material or from different materials. The brackets 62 and the trusses 50 may be made, for example, of sheet metal. In one example, the brackets 62 and the trusses 50 may be made of stainless steel sheet metal. However, the concepts disclosed herein are not limited in this regard. Any material may be used provided it satisfies the temperature requirements of the fuel cell system.

Each bracket 62 includes a projecting portion 63 extending in a direction perpendicular to a face of the bracket 62 that is welded to the cathode manifold 16. The projecting portion 63 extends along a length of the bracket 62. The projecting portion 63 includes a plurality of slots 64 positioned along a length thereof. The slots 64 are configured to receive projecting portions 52 of the truss 50 such that the upper surface 50A of the truss 50 rests upon an upper surface of the projecting portion 63 of a first bracket 62A, and the lower surface 50B of the truss 50 rests upon an upper surface of the projecting portion 63 of a second bracket 62B, where the second bracket is the bracket immediately adjacent to and beneath the first bracket. In other words, each truss 50 is connected to two brackets, and there are no intervening brackets between the first bracket and the second bracket.

Referring to FIGS. 13A-13D, after the projecting portions 52 of the truss 50 are received in the slots 64 of the first and second bracket 62A, 62B, the connection can optionally be further secured using a locking plate 90. The locking plate 90 may be made from the same material or from a different material than the brackets 62 and the trusses 50. The locking plate 90 may be made, for example, of sheet metal. In one example, the locking plate 90 may be made of stainless steel sheet metal. However, the concepts disclosed herein are not limited in this regard. Any material may be used provided it satisfies the temperature requirements of the fuel cell system.

One locking plate 90 is configured to be secured to a bottom surface of the projecting portion 63 of each of the first and second bracket 62A, 62B. Each locking plate 90 includes an aperture 92 at one or both of a proximal end and a distal end thereof, and one or more bent tabs 91 along a length thereof. As seen in FIG. 13C, the tab 91 may include a first portion that extends in a same direction as a face of the locking plate 90 that is secured to the bottom surface of the projecting portion 63 of each of the first and second bracket 62A, 62B, and second portion that extends in a direction at an angle (e.g., an acute angle, an obtuse angle, or a 90 degree angle) to the face of the locking plate 90 that is secured to the bottom surface of the projecting portion 63 of each of the first and second bracket 62A, 62B. When the locking plate 90 is secured to the bottom surface of the projecting portion 63 of a respective bracket 62, the tabs 91, in particular, the second portion of the tabs 91, are folded back towards the bracket 62 to prevent the locking plate 90 from slipping out. Although not illustrated, the locking plate 90 may also be used in conjunction with the previously described connector 60 to further secure the connection between the connector 60 and the truss 50.

In any of the embodiments described herein, the truss 50 may be somewhat flexible such that the truss may be pressed slightly to insert the truss 50 two adjacent connectors 60 or two adjacent brackets 62, and then released such that the protrusions 52 spring out and are inserted in the slots 61 of the connectors 60 or the slots 64 of the brackets 62 before the locking plate 90 is added.

Figure 14A:
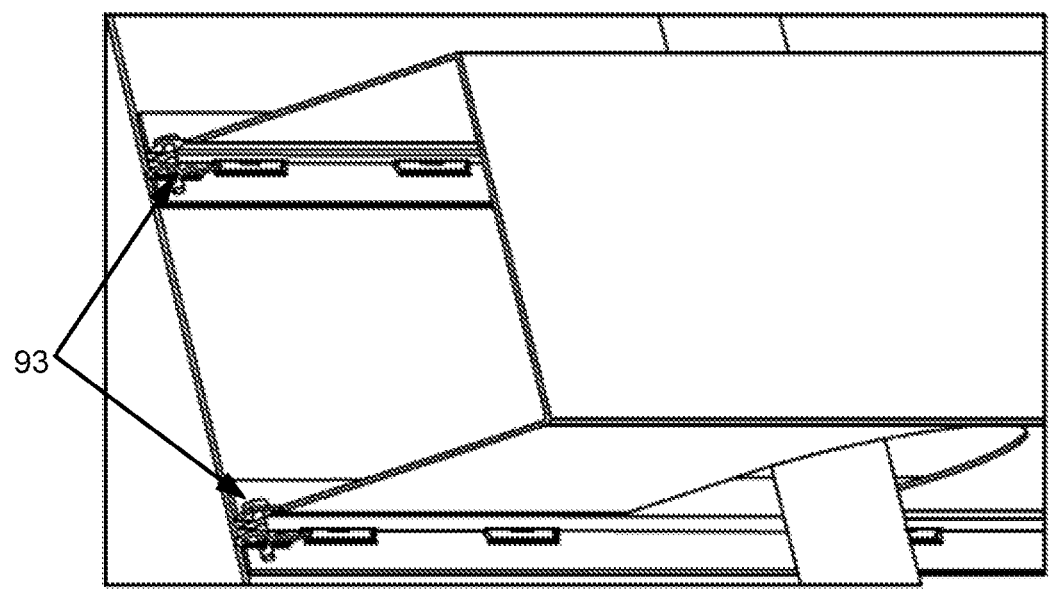
FIG. 14A shows a fastener configured to further strengthen the connection between the truss, the projecting portion of the bracket and the locking plate of FIG. 13D.
Figure 14B:
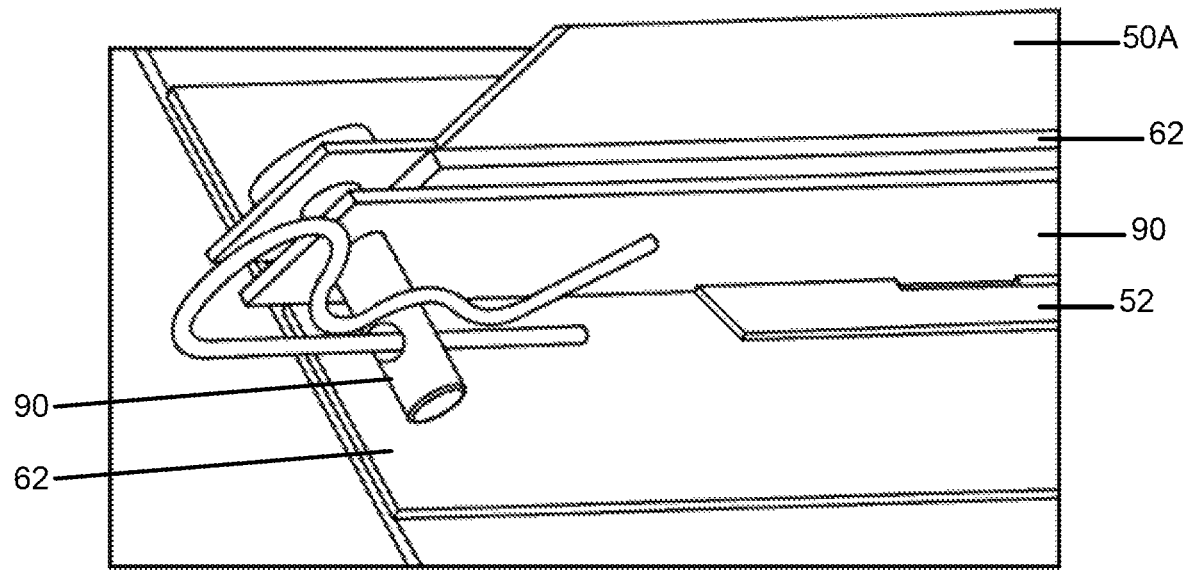
FIG. 14B is a close up view of the fastener of FIG. 14A. In the example of FIG. 14B, the fastener is a clevis pin.

Referring to FIGS. 14A and 14B, a fastener 93 may be received in the aperture 92 of each locking plate 90 and used to hold the locking plate 90 in position, thereby securing the connection between the truss 50, the projecting portion 63 of the respective bracket 62, and the respective locking plate 90. In some embodiments, the fastener 93 may be a clevis pin. In other embodiments, any other known connecting device may be used as the fastener 93, for example, a bolt and nut, a clamp, metal wire, etc. In other embodiments, the truss 50, the projecting portion 63 of the respective bracket 62, and the respective locking plate 90 may be welded together. Installation of the truss 50 on the manifold 16 using the brackets 62 and the clevis pin as the fastener 93 make installation easy and requires no tools.

Figure 9:
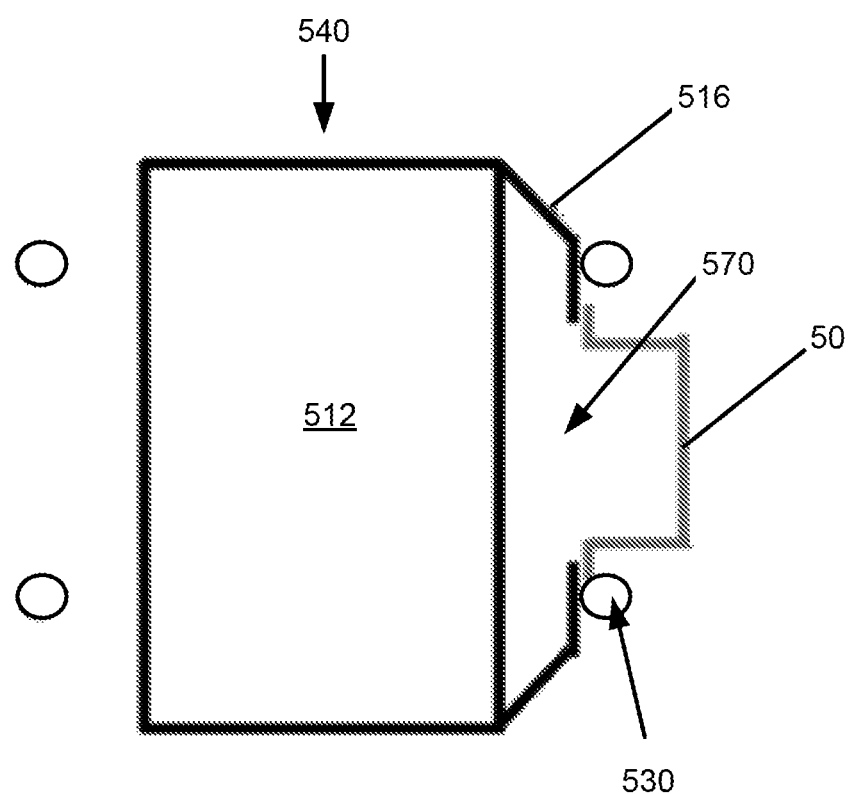
FIG. 9 is a schematic top view of a fuel cell system according to embodiments of the present application including manifold having a volume increased by the provision of a truss.

Referring now to FIG. 9, a top view of the fuel cell system 500 is schematically illustrated. In the embodiment of FIG. 9, at least one truss 50 is used to increase the volume of a sealed manifold 516. In particular, the truss 50 forms the exterior wall of the manifold 516. The increased volume of the cathode manifold 516 allows the fuel cell system to accommodate an increased cathode gas flow rate.

In the embodiment of FIG. 9, a first surface of the cathode manifold 516 contacts the fuel cell stack 512, and a second, opposing surface of the cathode manifold 516 includes an opening 570. At least one truss 50 is attached to the second, opposing surface and covers the opening 570 to seal the manifold 516. The truss 50 may be attached to the manifold 516 using the connector 60 described above. In particular, the connector 60 may be welded to an external surface of the manifold 516. The truss 50 is attached to the manifold 516 by inserting the projecting portion 52 of the truss 50 into the slot 61 of the connector 60.

During normal operation of a molten carbonate fuel cell (MCFC) stack, the MCFC stack shrinks between 3-5% in height during its operational lifetime. Many MCFC stacks are held together with an axial compression system actuated by springs. As the MCFC stack shrinks, the axial compression system reduces the amount of compressive force on the MCFC stack. Other fuel cell types (i.e., not just MCFC stacks) also shrink in height during their operational lifetime.

Figure 10:
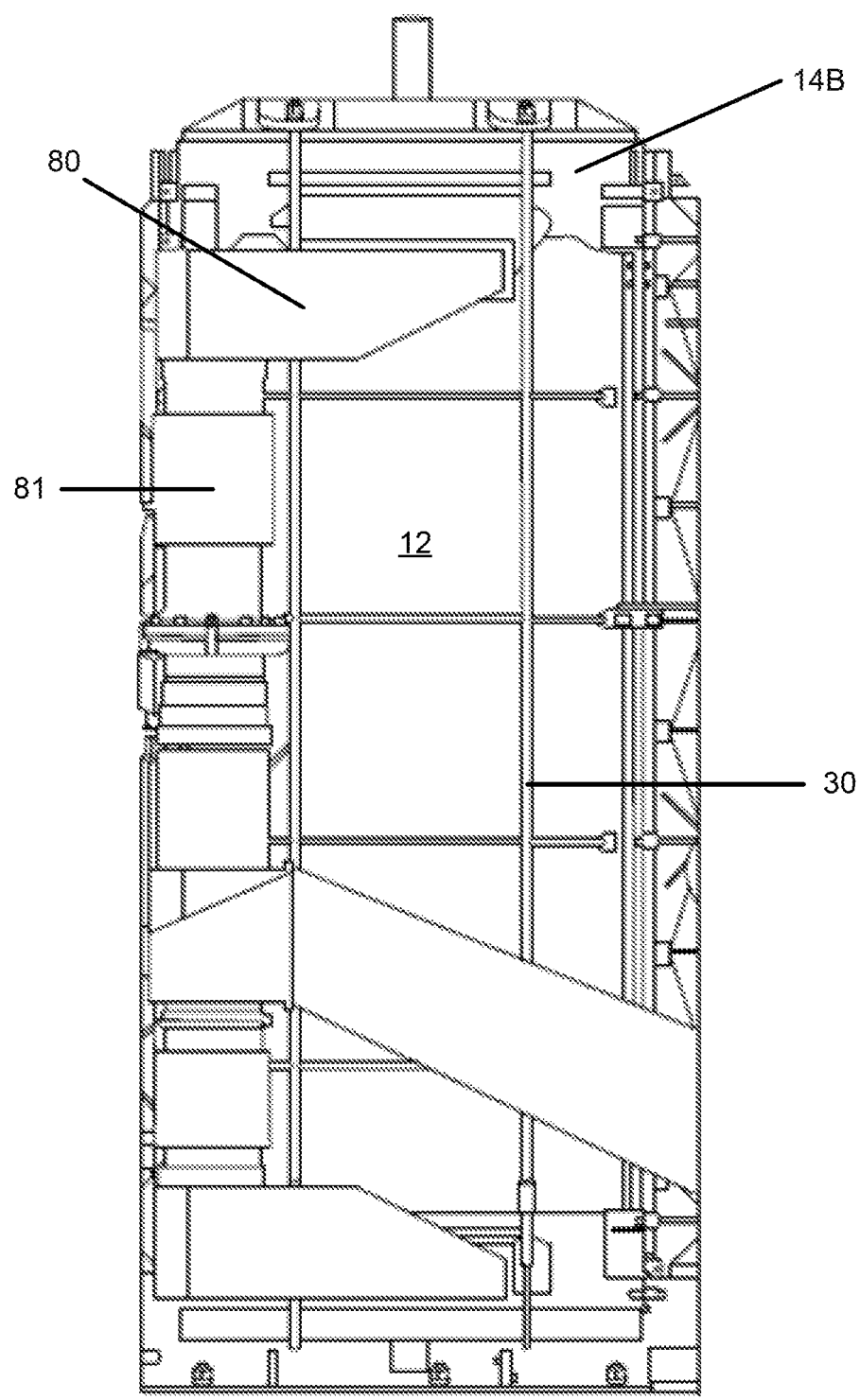
FIG. 10 is a side view of a fuel cell system according to embodiments of the present application including an expansion joint attached to a duct at the top of the fuel cell stack.

Referring to FIG. 10, an expansion joint 81 may be added in one or both of the anode out flow system or the cathode out flow system at a location, for example, proximate to a top of any one of the fuel cell stacks 12, 112, 212, 312, 412, 512, or 1012. In particular, a duct 80 may be attached to the top end plate of the fuel cell stack (e.g., the top end plate 14B), and the expansion joint 81 may be attached to the duct 80. The duct 80 is a different duct than the duct 240, 340, or 440, which were previously described. In the example of FIG. 10, the duct 80 is attached to an outlet side of the top flow-through endplate 14B. However, the concepts disclosed herein not limited in this regard. In other examples, the duct 80 may be attached to an outlet side of the bottom flow-through endplate 14A, or the system may include two ducts 80—one duct 80 attached to an outlet side of the top flow-through endplate 14B and another duct 80 may be attached to an outlet side of the bottom flow-through endplate 14A (see FIG. 4, with an arrow showing the flow to duct, which may be the duct 80). As discussed above, the fuel cell stack 12 is held together with an axial compression system actuated by springs (i.e., the springs at the base of the tie rods 30). Because the expansion joint 81 attached to the top of the fuel cell stack 12 acts as a spring, as the fuel cell stack 12 shrinks, the force in the expansion joint 81 will increase as the expansion joint is compressed. This compressive force increase pushes up on the fuel cell stack 12 opposite the forces created by the axial compression system (i.e., the expansion joint 81 decompresses the fuel cell stack 12). In order to avoid the additional reduction in stack compression force created by the expansion joint 81 decompressing the fuel cell stack 12, in some embodiments, the expansion joint 81 may be a pre-stretched bellows. For example, the bellows may be pre-stretched by 0.5 to 6 inches, 1 to 5 inches, 2 to 4 inches, etc. The pre-stretched bellows 81 is configured to allow the spring action of the expansion joint (i.e., the pre-stretched bellows 81) to add compression to the fuel cell stack 12 when desired, and as the fuel cell stack 12 shrinks during its operational lifetime, the pre-stretched bellows forces will become neutral so that the undesired impacts (.e., the additional reduction in stack compression force created by the expansion joint 81 decompressing the fuel cell stack 12) are avoided. In other words, the pre-stretched bellows 81 helps counteract the effect of stack shrinkage. The force created by the bellows can be set to start high and then relax over time.

In other examples, the expansion joint may be a pre-compressed bellows.

In the embodiments of the fuel cell system 10 described above, a cathode gas flow pressure drop is reduced or eliminated to allow for a more uniform flow to each cell in the fuel cell stack. This is accomplished by adding additional flow-through end plates or ducts, or by increasing a volume of the cathode manifold. In addition, the manifolds of the fuel cell system are stiffened or reinforced by adding trusses. The addition of trusses reduces the load on the fuel cell stack, thereby allowing the fuel cell system to accommodate the higher pressures associated with increased cathode gas flow.

In the embodiments of the fuel cell system 10 described above, the manifold 16 described was the cathode manifold. However, the concepts disclosed herein are not limited in this regard. The embodiments of FIGS. 2-14B described above may be applied to the anode manifold in a similar manner.

As utilized herein, "cathode gas flow" or "gas flow" generally refers to the flow of air within the fuel cell system. In some cases, the cathode gas may have a higher concentration of carbon dioxide than typically found in air, for example, carbon dioxide may comprise up to 20% of the cathode gas. For example, carbon dioxide may comprise approximately 12% of the cathode gas.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The terms "attached," "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of concepts disclosed herein. For example, the heat recovery heat exchangers may be further optimized.

What is claimed:

1. A fuel cell system comprising:
a fuel cell stack comprising a plurality of fuel cells positioned between opposing end plates;
an anode manifold configured to direct anode gas into or out of the fuel cell stack;
a cathode manifold configured to direct cathode gas into or out of the fuel cell stack; and
a plurality of trusses attached to an external surface of at least one of the cathode manifold or the anode manifold in a height direction of the fuel cell stack;
wherein each of the plurality of trusses comprises a plurality of projecting portions, each of the plurality of projecting portions is configured to be received in a slot defined by a connector or a bracket disposed on the external surface so as to attach the plurality of trusses to the external surface; and
wherein the plurality of trusses is configured to reinforce the fuel cell system.

2. The fuel cell system of claim 1, further comprising a plurality of tie rods arranged around an exterior of the fuel cell system.

3. The fuel cell system of claim 2, wherein:
the plurality of projecting portions is provided along a length of an upper surface of each of the plurality of trusses and a lower surface of the same;
each of the plurality of trusses comprises at least one recessed portion in the upper surface, and at least another recessed portion in the lower surface;
the recessed portion in the upper surface is aligned with the recessed portion in the lower surface; and
the recessed portion in the upper surface and the recessed portion in the lower surface are configured to receive a tie rod of the plurality of tie rods therethrough.

4. The fuel cell system of claim 3, wherein the connector defines the slot configured to receive a projecting portion of the plurality of projecting portions.

5. The fuel cell system of claim 3, further comprising at least a first connector and a second connector configured to attach the plurality of trusses to the external surface of at least one of the cathode manifold or the anode manifold, wherein:
the first connector and the second connector are provided at different heights;
the first connector defines the slot configured to receive a projecting portion of the plurality of projecting portions provided on the upper surface of one of the plurality of trusses; and
the second connector comprises at least one slot configured to receive a projecting portion of the plurality of projecting portions provided on the lower surface of the same truss.

6. The fuel cell system of claim 5, further comprising:
a first locking plate secured to a surface of the first connector, the first locking plate configured to strengthen a connection between the one of the plurality of trusses and the first connector; and
a second locking plate secured to a surface of the second connector, the second locking plate configured to strengthen a connection between the same truss and the second connector.

7. The fuel cell system of claim 6, wherein:
each of the first locking plate and the second locking plate comprises an aperture at one or both of a proximal end and a distal end thereof, and one or more bent tabs along a length thereof; and
the one or more bent tabs are configured such that in operation, the one or more bent tabs are folded back towards a respective one of the first connector and the second connector to prevent a respective one of the first locking plate and the second locking plate from slipping out of the respective one of the first connector and the second connector.

8. The fuel cell system of claim 7, further comprising a fastener configured to be received in a portion of the one of the plurality of trusses, a portion of the respective one of the first connector and the second connector, and the aperture of the respective one of the first locking plate and the second locking plate;
wherein the fastener is configured to further strengthen the connection between the one of the plurality of trusses, the respective one of the first connector and the second connector, and the respective one of the first locking plate and the second locking plate.

9. The fuel cell system of claim 3, wherein the bracket defines the slot configured to receive a projecting portion of the plurality of projecting portions.

10. The fuel cell system of claim 3, further comprising a first bracket and a second bracket configured to attach the plurality of trusses to the external surface of at least one of the cathode manifold or the anode manifold, wherein:
the first bracket and the second bracket are provided at different heights;
the first bracket defines the slot configured to receive a projecting portion provided on the upper surface of one of the plurality of trusses;
the second bracket comprises at least one slot configured to receive a projecting portion provided on the lower surface of the same truss;
the upper surface of the one of the plurality of trusses rests upon an upper surface of the first bracket;
the lower surface of the same truss rests upon an upper surface of the second bracket; and
the first bracket and the second bracket are immediately adjacent each other without another bracket intervening therebetween.

11. The fuel cell system of claim 2, further comprising a plurality of springs, each spring located at a base of one of the tie rods;
wherein the tie rods are configured such that in operation the tie rods pull down and compress the fuel cell stack via the springs.

12. The fuel cell system of claim 2, wherein:
at least one of the cathode manifold or the anode manifold extends beyond a perimeter defined by the plurality of tie rods such that a volume of the at least one of the cathode manifold or the anode manifold is increased; and the at least one of the cathode manifold or the anode manifold includes at least one clearance extending therethrough in the height direction, the at least one clearance configured to receive a tie rod of the plurality of tie rods such that the tie rod extends through the at least one of the cathode manifold or the anode manifold.

13. The fuel cell system of claim 1, wherein each of the opposing end plates is a flow-through end plate configured to collect at least one of cathode gas from the fuel cell stack that flows through the cathode manifold or anode gas from the fuel cell stack that flows through the anode manifold.

14. The fuel cell system of claim 1, wherein each of the opposing end plates is a flow-through end plate configured to collect cathode gas from the fuel cell stack that flows through the cathode manifold.

15. The fuel cell system of claim 1, wherein each of the opposing end plates is a flow-through end plate configured to collect anode gas from the fuel cell stack that flows through the anode manifold.

16. The fuel cell system of claim 1, further comprising at least one external duct that projects from at least one of the cathode manifold or the anode manifold in a direction extending away from the fuel cell stack;
wherein the at least one external duct is configured such that in operation, a flow rate of the cathode gas or the anode gas removed from the fuel cell system via the at least one external duct is increased.

17. The fuel cell system of claim 1, further comprising:
a duct connected to one of the opposing end plates; and
a pre-stretched expansion joint connected to the duct.

18. The fuel cell system of claim 17, wherein the pre-stretched expansion joint is a pre-stretched bellows.

19. The fuel cell system of claim 1, further comprising:
a first duct connected to a first one of the opposing end plates;
a second duct connected to a second one of the opposing end plates; and
a pre-stretched expansion joint connected to at least one of the first duct or the second duct.

20. A fuel cell system comprising:
a fuel cell stack comprising a plurality of fuel cells positioned between opposing end plates;
an anode manifold configured to direct anode gas into or out of the fuel cell stack;
a cathode manifold configured to direct cathode gas into or out of the fuel cell stack; and
a plurality of trusses coupled to an external surface of at least one of the cathode manifold or the anode manifold in a height direction of the fuel cell stack;
wherein each of the plurality of trusses includes a projecting portion configured to be received in a slot defined by a bracket or a connector disposed on the external surface so as to couple the plurality of trusses to the external surface.

* * * * *